United States Patent [19]

Boultinghouse

[11] 4,213,812

[45] Jul. 22, 1980

[54] PROCESS FOR PREPARING CROSSLAPPED FILM STRUCTURES

[75] Inventor: Harold D. Boultinghouse, Bartlesville, Okla.

[73] Assignee: Phillips Petroleum Company, Bartlesville, Okla.

[21] Appl. No.: 16,743

[22] Filed: Mar. 5, 1970

[51] Int. Cl.² .............................................. B37B 7/08
[52] U.S. Cl. .................... 156/226; 156/476; 156/308.4; 270/58
[58] Field of Search .............. 156/73, 380, 223, 226, 156/227, 217, 299, 476, 304, 300; 270/52, 58; 273/149; 83/54, 194

[56] References Cited

U.S. PATENT DOCUMENTS

| 2,193,638 | 3/1940 | Morton | 273/149 R |
| 2,307,142 | 1/1943 | Lee | 270/52 |
| 2,314,790 | 3/1943 | Jenter | 281/16 |
| 2,675,239 | 4/1954 | Saunders | 273/149 R |
| 2,957,065 | 10/1960 | Bundegaard et al. | 83/924 |
| 3,160,044 | 12/1964 | Somerville | 83/54 |

OTHER PUBLICATIONS

"Ultrasonics in Industry," *Proceedings of the IEEE*, vol. 53, No. 10, Oct. 1965, pp. 1292–1304, E. B. Steinberg.

*Primary Examiner*—Harold J. Tudor

[57] ABSTRACT

A process for preparing layered, nonbonded, structures of crosslapped film is disclosed wherein at least two laminates of layered, nonbonded, film are combined by interleaving the plies of the laminates to produce the structure. The layers in the structure are maintained in position during interleaving by fastening the plies of each laminate together along one edge only of each laminate.

6 Claims, 1 Drawing Figure

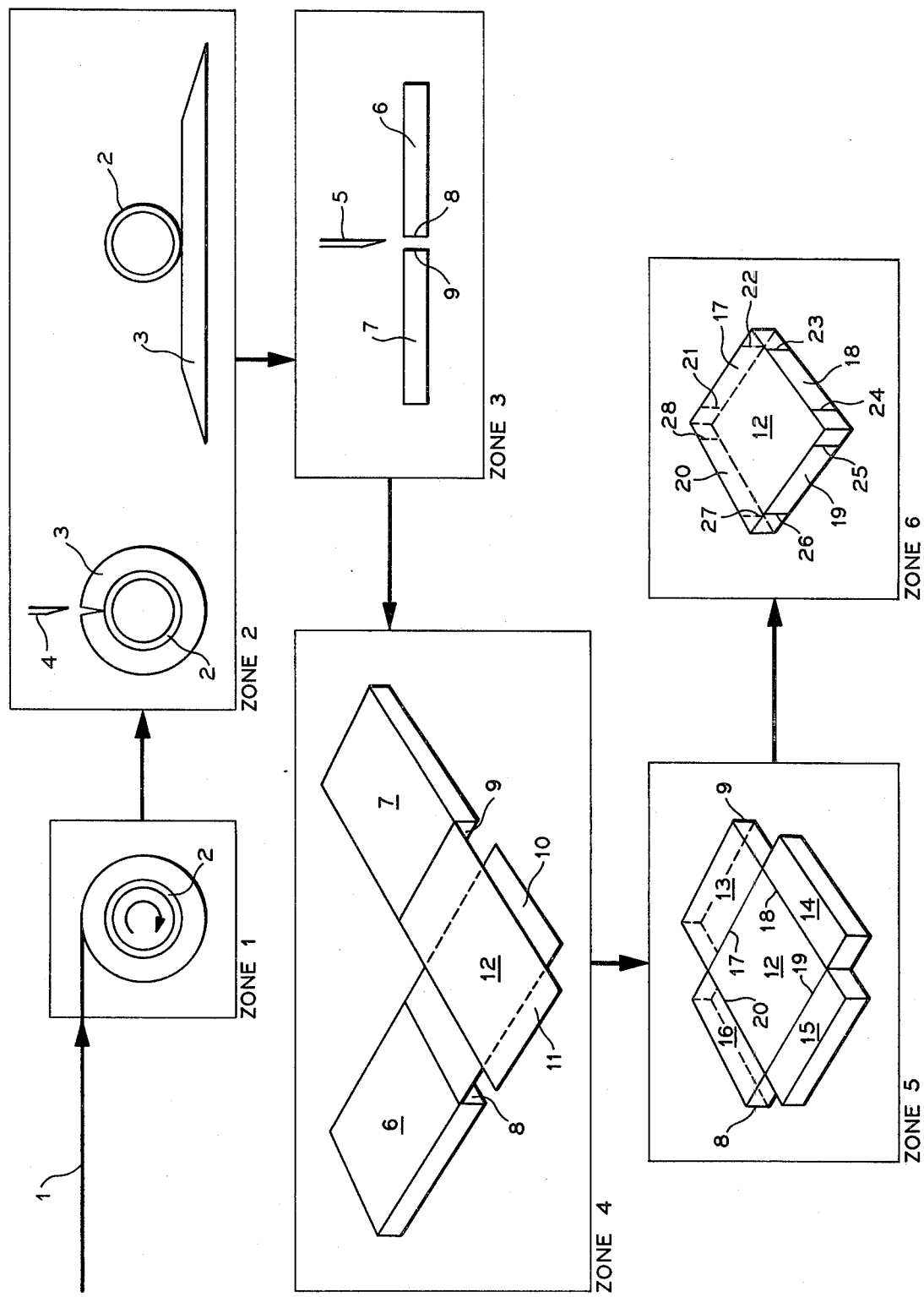

PROCESS FOR PREPARING CROSSLAPPED FILM STRUCTURES

This invention relates to laminated film materials. It more particularly relates to laminated materials comprised of oriented layers of polyolefin film. It specifically relates to a process for positioning the layers of film in the laminate such that the directions of orientation differ from layer to layer.

At present a laminated structure prepared from crosslapped layers of oriented polyolefin film has found utility as an armor material. This laminated structure is comprised of a plurality of units of unidirectionally oriented polyolefin film or fibers which are stacked one on top of the other such that the lines of orientation of adjacent units are at angles to each other. However, the method used for stacking the units to prepare the structure is inconvenient in that each unit is handled separately as it is positioned in the structure.

The individual units themselves being extremely thin are difficult to handle and cut to size. It is also difficult to retain the units previously placed in a structure in proper alignment therein, while the process of placing units is proceeding. The units slip and slide over one another and, futhermore, the individual handling tends to create a static charge on the units which makes them repel each other. The tendency of the units to slide and fail to remain in position is aggravated by the repelling feature associated with the individual handling and placing of each unit. None of the units in a structure are bonded together until all the units desired in the final structure are placed therein. Therefore, in order to assure proper alignment of the units under the present system, a great deal of time and care must be expended for each structure prepared.

It is thus an object of this invention to provide an improved process for preparing a laminated structure of crosslapped layers of oriented film.

Other aspects, objects, and the various advantages of this invention will become apparent to one skilled in the art from consideration of the following specification, figure, and claims.

I have now discovered a process for combining at least a first laminate with a second laminate to produce a nonbonded structure consisting of layers of crosslapped film. The first and second laminate each consist of a multiplicity of plies of nonbonded, layered, film wherein the plies of each laminate are securely fastened one to another along only one edge. The laminates are combined by crosslapping the film plies of the first laminate with the film plies of the second laminate. The crosslapping procedure comprises placing the first laminate and the second laminate in the same plane with the fastened edges thereof being adjacent and at an angle to each other, rotating at least one film ply from the first laminate about its fastened edge and placing the film ply on the plane of the two laminates, and rotating at least one film ply from the second laminate about its fastened edge and placing the film ply on the plane of the two laminates. The film ply from the second laminate overlaps the film ply from the first laminate providing that the fastened edges of the two laminates are in appropriate proximity and angular relationship. The two described film rotation steps are repeated in alternation until the desired number of film plies are positioned in the crosslapped structure thus formed.

The process of this invention is further and more particularly understood by referring to the description which follows and the drawing, which is a flow chart depicting the various steps in the process of this invention, including winding zone 1, cutting zone 2, second cutting zone 3, crosslapping zone 4, finishing zone 5, and second finishing zone 6.

Referring now to the drawing, film 1 of polyolefin material which has been unidirectionally oriented is continuously introduced into winding zone 1 wherein it is wrapped on the periphery of cylinder 2 which is being axially rotated by a suitable means not shown. Oriented film 1, whose orientation direction is parallel with the direction of motion of the film and also perpendicular to any plane containing the axis of cylinder 2 at the line of intersection of the wrapped film and the plane, is introduced into zone 1 for the period of time required to create a desired thickness of film which accumulates in wrapped layers about the periphery of cylinder 2. For reasons to be disclosed herein, the desired thickness of film can be supplied by one half the total number of film layers in the ultimate structure.

When the desired thickness of film is accumulated, cylinder 2 having thereon the layers of wrapped film is transferred to cutting zone 2 wherein a blanket of layered film is formed by cutting layered film 3 with cutting means 4 by a single cut which extends from the outer layer of layered film 3 to the periphery of cylinder 2 and across the full width of layered film 3. It is preferred that the cut lie in a plane containing the axis of cylinder 2. Subsequent to cutting, layered film 3 is taken in its entirety from the periphery of cylinder 2 as a single unit to thus produce a sheet or blanket of oriented film, the length of which is approximately equal to the circumference of cylinder 2, the thickness of which is approximately equal to the thickness of the layered film initially wound on cylinder 2 and the width of which is equal to the width of oriented film 1. At this point layered film 3 consists of a multiplicity of plies of nonbonded, oriented film in which the direction of orientation of all the plies is parallel.

Layered film 3 is then transferred to second cutting zone 3 wherein cutting means 5 cuts layered film 3 into at least two separate laminates 6 and 7 wherein the line of the cut is perpendicular to the orientation direction of the film. It is preferred that the cut lie in a plane perpendicular to the plane of the layered film. Laminates 6 and 7 each contain plies or layers of nonbonded, oriented, laminated film in which the directions of orientation are parallel. The plies of film in laminates 6 and 7 have a tendency to slide and separate which would cause delamination. Accordingly, edge 8 of laminate 6 and edge 9 of laminate 7 are each fastened by suitable means such as by clamp, heat sealing or bonding. The fastening of the edges 8 and 9 maintains the parallel alignment of the orientation direction of the film layers and prevents the film from sliding off the laminate.

Cutting means 5 can perform the dual function of cutting layered film 3 and at the same time sealing edges 8 and 9 of laminates 6 and 7. It has been found that a powered saw, such as a band saw and the like, not only cuts the material but also creates sufficiently high localized heat, probably by friction, to seal the edges together.

Laminates 6 and 7 having fastened edges 8 and 9 are transferred to crosslapping zone 4, wherein laminate 6 and laminate 7 are placed in the same plane with edges 8 and 9 thereof being adjacent, as shown, and at an angle to each other. In a preferred embodiment laminate 6 and laminate 7 are positioned such that the respective fastened edges 8 and 9 form an angle of 90 degrees with each other. Laminates 6 and 7 are then combined by crosslapping the individual film plies which are contained in the laminates. In the process of crosslapping, at least one film ply, such as film ply 10, of laminate 6 is rotated about fastened end 8 at least 180 degrees and placed in the plane of laminates 6 and 7, and then at least one film ply, such as film ply 11, of laminate 7 is rotated about fastened end 9 at least 180 degrees and placed on the plane of laminates 6 and 7. As shown in FIG. 1, film ply 11 crosslaps film ply 10. The film plies in laminate 7 are fastened to end 9 and the film plies in laminate 6 are fastened to end 8, therefore, by maintaining ends 8 and 9 in a given angular relationship to one another, the angular relationship of the crosslapped film plies is readily maintained. The crosslapping of film plies of laminates 6 and 7 is continued in alternation in the same manner as described with respect to film plies 10 and 11 until the desired number of crosslapped film plies are accumulated in structure 12. At least half of the total number of film plies in structure 12 are contained in each of laminates 6 and 7. Therefore, film 1 is introduced into winding zone 1 until at least one half of the desired number of film plies in structure 12 are accumulated in layered film 3.

When the desired number of film plies are accumulated in structure 12, structure 12 is transferred to finishing zone 5 wherein sublaminates 13, 14, 15 and 16, not being crosslapped, can be removed from structure 12 along lines 17, 18, 19, and 20 to thus produce a structure consisting of layers of crosslapped oriented film. In a preferred method of removing sublaminates 13, 14, 15, and 16 from structure 12, a solid, flat plate whose length and width dimensions coincide with lines 17, 18, 19 and 20 is placed on structure 12, and while using the plate and suitable clamp means structure 12 is placed in compression and sublaminates 13, 14, 15 and 16 are cut from structure 12 using the exterior edges of the plate as guides to thus form cut edges 17, 18, 19 and 20 on structure 12.

Structure 12 is then transferred to finishing zone 6 while still being held in compression wherein, finishing zone 6, the edges of structure 12 are fastened or secured so as to prevent delamination of the crosslapped oriented film units contained therein. The fastening of the edges may be conveniently conducted by local heat sealing of the edges of structure 12 in lines adjacent to the corners of structure 12. This can be conducted by applying a hot wire at lines 21 and 22 of edge 17 at lines 23 and 24 of edge 18, at lines 25 and 26 of edge 19, and at lines 27 and 28 of edge 20.

Structure 12, now ready for further processing, consists of a plurality of units of unidirectionally oriented polyolefin film. The film units in structure 12 are stacked one on top of the other such that the lines of orientation of adjacent units are at angles to each other. Each unit consists of at least one ply or single sheet of unidirectionally oriented polyolefin film, and all plies in a single unit are positioned such that the lines of orientation of the plies are parallel.

The polyolefin materials utilized for formation of each unit are solid, high molecular weight synthetic linear olefin polymer products or mixtures thereof formed by the polymerization of at least one monoolefin having from 2 to 8 carbon atoms therein which are capable of being formed into filaments or films which can be drawn (oriented) to a high percentage of elongation. While any means for orienting the material can be used, the material should be highly oriented, utilizing a draw ratio in the range of 6:1 to 20:1, preferably in the range of 9:1 to 14:1. Polyethylene, polypropylene, poly(1-butene), ethylene-1-butene copolymers, ethylene-propylene copolymers and the like, as well as blends or mixtures thereof are polyolefins which can be used as materials in the structure.

In a preferred embodiment, the specific polymeric material comprises a blend of polypropylene and polyethylene wherein the polypropylene is present to the extent of 75 to 99 percent by weight and the polyethylene is present to the extent of 25 to 1.0 percent by weight of the blend.

Each unit in the structure contains from 1 to 100 plies or more of polyolefin, preferably from 2 to 40 plies, wherein the direction of orientation of each ply in a single unit is the same, and wherein each ply has a thickness of 0.5 to 25 mils. In the formation of the structure, adjacent units are placed in any stacked relationship so long as their direction of orientation is not parallel. It is preferred that the direction of orientation of adjacent units differ by 90 degrees, but lesser angular differences can be employed.

EXAMPLE I

A nonbonded structure composed of unidirectionally oriented blown film tube of a blend of 95 percent polypropylene and 5 percent polyethylene which had been flattened and drawn at a ratio of 12 to 1 so that the final thickness of the flattened film tube (2 film plies) after orienting was approximately 2 mils was prepared as follows:

A sheet of 8-inch wide film, composed of the above described oriented material, was wound on a rotating cylinder having an outside diameter of 3.5 inches. The direction of motion of the film, which was perpendicular to a plane containing the axis of the cylinder, and the orientation direction of the film were parallel. The winding process was discontinued after the total diameter of the cylinder and the layered film thereon was 24 inches.

The layered film was then removed from the cylinder by cutting it with a sharp knife from the exterior of the wrapped film to the cylinder along a plane containing the axis of the cylinder. This cut produced a single blanket of nonbonded layered oriented film containing a plurality of 2-ply film units wherein the direction of orientation of all the units in the blanket was essentially parallel. The blanket was approximately 10.25 inches thick, 8 inches wide and approximately 11 inches to approximately 75 inches long.

A portion of the blanket which contained more than 50 2-ply film units, all of which were longer than 14 inches, was transferred to a band saw for cutting and end sealing. The blanket was cut on a band saw to produce at least two laminates each having more than 50 2-ply film units and each being at least 7 inches long. The cut was made in a direction perpendicular to the orientation direction of the film. During the cutting process, the band saw created sufficient localized heat to seal the cut edges of each of the two laminates thus formed.

Two laminates, prepared as above described and each having 1 edge sealed as above described, were then combined by alternately crosslapping the film units of each as follows. The two laminates were placed on a horizontal surface and positioned thereon such that the respective sealed edges formed a 90-degree angle and were in close proximity. The position of the laminates was similar to the position of laminates 6 and 7 having sealed edges 8 and 9 as shown in zone 4 of FIG. 1. The film units of the laminates were crosslapped in accordance with the crosslapping procedure set out for laminates 6 and 7 of FIG. 1. During the crosslapping the adjacent film units in the crosslapped structure were maintained at an angle of 90 degrees to each other by maintaining the respective sealed edges at a 90-degree angle. When 100 2-ply film units were placed in the structure the crosslapping was discontinued.

A 6¾ inch by 6¾ inch by ¼-inch thick steel plate was placed on the structure in such a position that it only covered the crosslapped portion of the structure. The steel plate was then clamped in position with a press and while the structure was thus held in compression, the portions of film not covered by the plate were trimmed off with a sharp knife flush with the edges of the plate. After the structure was thus trimmed to size, and while it was still held in compression a red hot 20-gauge wire (approx.) which was heated in a torch, was applied to each side of the four corners of the structure. The lines of application of the hot wire, which were approximately one inch from each corner, were vertical, and thus heat sealed all the layers of film units in position. This heat sealing technique was sufficient to prevent delamination of the nonbonded structure and it maintained the orientation alignment of the film units in the structure, after the structure was released from compression and the steel plate removed.

During the crosslapping procedure, the individual film plies did not slip and slide, and the desired angular relationship of adjacent film units was easily and conveniently maintained by maintaining the angle between the sealed edges of each laminate.

Reasonable variations and modifications of this invention can be made, or followed, in view of the foregoing disclosure, without departing from the spirit or scope thereof.

I claim:

1. A process for preparing at least one structure comprised of layered, nonbonded, crosslapped film from at least two layered, nonbonded film laminates produced from a single sheet of film whereby said film is continuously introduced into a winding zone containing therein a rotating means, accumulating said film in wrapped layers on the periphery of said rotating means until a desired thickness of layered film is established thereon, transferring said rotating means containing thereon said layered film to a zone wherein said layered film is removed from said rotating means by severing said layered film in a plane from the outer layer of said layered film to the periphery of said rotating means to thus produce at least one blanket of layered film, transferring said blanket of layered film to a zone and therein severing said blanket of layered film to thus produce said two layered nonbonded film laminates; said process further comprising a placement step, a first rotation step, and a second rotation step; said placement step comprising placing in a crosslapping zone and in the same plane a first of said film laminates having a first fastened edge, and a second of said film laminates having a second fastened edge such that said first fastened edge and said second fastened edge are adjacent and at an angle to each other; said first rotation step comprising rotating at least a first film ply of said first film laminate about said first fastened edge and placing said first film ply on said plane; said second rotation step comprising rotating at least a second film ply of said second film laminate about said second fastened edge and placing said second film ply on said plane overlapping said first film ply; said first and said second rotation steps being repeated in alternation until the desired number of film plies are placed in said structure.

2. The process of claim 1 wherein said film is unidirectionally oriented.

3. The process of claim 2 wherein said film is unidirectionally oriented; the orientation direction of said film and the direction of motion of said film entering said winding zone are parallel; and said severing of said blanket of layered film is in a direction perpendicular to the orientation direction of said film.

4. The process of claim 3 wherein said severing of said blanket of layered film is accompanied by localized heat sufficient to seal the resulting severed edges of said two-layered nonbonded film laminates.

5. The process of claim 4 wherein said layered, nonbonded structure is transferred from said crosslapping zone to a first finishing zone wherein portions of said structure not containing crosslapped film are removed to thus produce a second structure consisting of layers of crosslapped unidirectionally oriented film.

6. The process of claim 5 wherein said second structure is transferred to a second finishing zone wherein the edges of said second structure are fastened to thus prevent delamination of said second structure.

* * * * *